United States Patent [19]

Moshfeghi

[11] Patent Number: 5,633,951
[45] Date of Patent: May 27, 1997

[54] REGISTRATION OF VOLUMETRIC IMAGES WHICH ARE RELATIVELY ELASTICALLY DEFORMED BY MATCHING SURFACES

[75] Inventor: Mehran Moshfeghi, White Plains, N.Y.

[73] Assignee: North America Philips Corporation, New York, N.Y.

[21] Appl. No.: 482,690

[22] Filed: Jun. 7, 1995

Related U.S. Application Data

[63] Continuation of Ser. No. 992,982, Dec. 18, 1992.

[51] Int. Cl.$^6$ .................................................. G06T 17/40
[52] U.S. Cl. ........................... 382/154; 382/294; 382/131
[58] Field of Search .................................. 382/131, 154, 382/285, 294; 364/413.13, 413.22; 395/119, 125, 127

[56] References Cited

U.S. PATENT DOCUMENTS

| | | | |
|---|---|---|---|
| 4,791,581 | 12/1988 | Ohba | 364/521 |
| 5,359,513 | 10/1994 | Kano et al. | 364/413.13 |

OTHER PUBLICATIONS

Bajcsy et al. "Multiresolution Elastic Matching," *Computer Vision, Graphics and Image Processing* vol. 46, pp.1–21, 1989.

True et al. "Volume Warping" Proceedings, Visualization 1992, pp. 308–315, Oct. 1992.

Mazziotta et al. "Relating Structure to Function in vivo with Tomographic Imaging" CIBA Foundation Symposium on Exploring Brain Functional Anatomy with Positron Tomography, vol. 63 (1991), pp. 93–112.

Guan et al., "Design for a 3D Deformable Brain Atlas" Computer-Based Medical Systems, Proc. 4th Annual IEEE Symposium (May 1991), pp. 113–120.

*Primary Examiner*—Leo Boudreau
*Assistant Examiner*—Jon Chang
*Attorney, Agent, or Firm*—Jack D. Slobod

[57] ABSTRACT

An 3D imaging method registers relatively deformed first and second volumetric images of an object which may be obtained from different imaging modalities, and/or at different times by performing an elastic geometric transformation on one of the volumetric images. The method includes extracting first and second corresponding surfaces from the respective first and second images, which surfaces delineate the same feature, such as a bone/tissue interface. This is done by extracting a stack of contours for each surface. The first surface is iteratively warped toward alignment with the second surface to arrive at a global translation vector and a set of residual surface distortion vectors. Volume distortion vectors, determined by applying a weighting function to the residual surface distortion vectors, are used to indicate the locations in the second volumetric image of voxel centers whose interpolated intensities are to be moved to lattice points. The weighting function includes a constant indicative of elastic stiffness of the second volume. The extraction of the first surface, surface warping, and volume distortion vector determination steps are repeated in successive iterations until a measure of mis-registration between the volumetric images is less than a predetermined value, with the elastic stiffness constant being decreased each time.

10 Claims, 8 Drawing Sheets

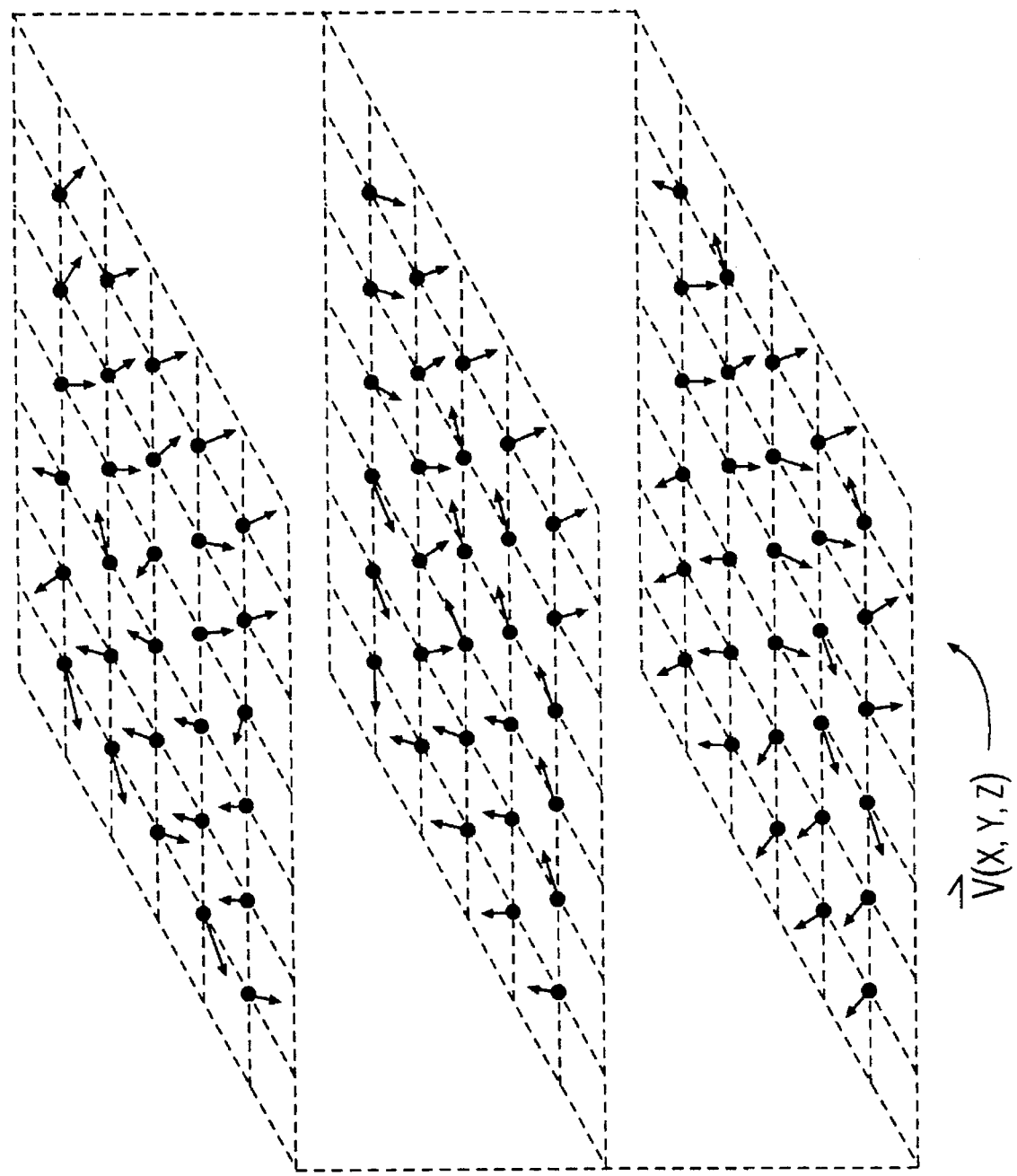

REGISTRATION OF VOLUMETRIC IMAGES WHICH ARE RELATIVELY ELASTICALLY DEFORMED BY MATCHING SURFACES

This is a continuing application based upon prior application Ser. No. 07/992,982 filed Dec. 18, 1992.

BACKGROUND OF THE INVENTION

1. Field of the Invention

The present invention relates to techniques for matching, registering, combining or correlating two or more images of a body, or a region thereof, at least one of which is obtained by scanning the body with an imaging apparatus. In its particular aspects, the present invention relates to the matching of two or more volumetric images, where the imaged body region exhibits local geometric deformations which are accounted for by an elastic transformation.

2. Description of the Related Art

Combined use of volumetric images obtained from different imaging modalities or from the same modality at different times, or the matching of an image to a standard image, has numerous industrial and medical applications. In the medical imaging field, three dimensional image studies may be obtained from X-ray Computed Tomography (CT), Magnetic Resonance Imaging (MRI), Positron Emitted Tomography (PET), Single Photon Emission Computed Tomography (SPECT) and Ultrasound modalities. In addition, it is a common practice to collect a volumetric image data set as two dimensional image data for each of a stack of slices. However collected, a volumetric image has intensity values or voxels centered at lattice points in a regular 3D grid.

These modalities often provide complementary information, but are generally characterized by different spatial and contrast resolution as well as differences in position, orientation and scale. Furthermore, a standard image might be available for comparison purposes, for example, from a computerized anatomic atlas. Combined use of two or more of such images has potential applications in functional/anatomic correlation, radiation treatment planning, surgical planning and retrospective studies. All such applications require that the images be registered with each other.

Global affine transformations have been applied to register cranial images, where rigid body assumptions are likely to hold, to account for translation, rotation and scaling. Landmark matching techniques result in global polynomial transformations which can correct for nonrigid transformations sufficiently to register the landmarks. However, local deformations cannot be accounted for thereby.

Burr (D. J. Burr, "A Dynamic Model for Image Registration", Comput. Graphics Image Process. 15, 1981, 102–112) proposed a process of automatic registration of deformed two dimensional images wherein nearest neighbor vectors at each point in one image are defined by connecting that point to the most similar point in a square neighborhood in the other image, which are subjected to a Gaussian cooperative smoothing. Such an approach is not useful for medical gray scale images because of the absence of strong local correlations in intensity patterns. Burr (D. J. Burr, "Elastic Matching of Line drawings", IEEE Trans. Pattern Anal. Mach. Intelligence, PAMI-3, No. 6, 1981, 708–713) also proposed elastic matching of line drawings, made up of points alternating with connecting line segments, using feature displacement vectors directed from points on one line drawing perpendicularly to the nearest line segment on the other line drawing, which I hereafter refer to as "Burr's algorithm". Smoothing of the field of feature displacement vectors is accomplished by elasticity in the line images. Burr's algorithm has also been used for elastic interpolation between contours in two successive serial cross sections (W. C. Lin et al., "Dynamic elastic interpolation for 3-D medical image reconstruction from serial cross sections, IEEE Trans. on Medical Imaging, 7, No. 3, September 1988, 225–232).

Broit and Bacsy (R. Bacsy et al., "Matching of deformed images", Proceedings of the VIth International Conference on Pattern Recognition, Munich, 1982, pp. 351–353) reported a two dimensional model-based object matching approach through elastic deformation, where matching is formulated as a minimization problem with a cost functional that combines a deformation model and a similarity measure. The deformation model involves the strain energy of a globally smoothed elastic body. This approach was later extended to three dimensions by Bajcsy and Kovacic (R. Bacsy et al., "Multiresolution elastic matching", Computer Vision, Graphics, and Image Processing, 46, 1989, pp. 1–21).

I have previously reported (M. Moshfeghi, "Multimodality Image Registration Techniques in Medicine", Proc. IEEE Engineering in Medicine & Biology Society 11th Annual International Conference, 1989, pp. 2007–2008 and M. Moshfeghi, "Elastic Matching of Multimodality Medical Images", CVGIP: Graphical Models and Image Processing, Vol. 53, No. 3, May 1991, pp. 271–282) a two dimensional local registration method involving extracting and matching corresponding contours by iteratively warping a candidate contour from an image to be elastically deformed onto a goal contour from a reference image using an extension of Burr's algorithm. Point pair correspondences between the candidate and goal contours are used to determine local displacement vectors applied to points along the candidate contour. Residual local displacement vectors remaining after subtraction of global image shift are then interpolated onto the entire image using a weighting function which decays asymptotically to zero for large distances. The need was then noted by me to extend the algorithm to 3D, so as to use elastic deformation of corresponding surfaces. That extension of my prior work is the subject of this application.

SUMMARY OF THE INVENTION

It is an object of the present invention to provide a method for registering relatively deformed first and second volumetric images, at least one of which is obtained from an imaging modality, by extracting corresponding surfaces from the respective volumetric images and warping one of the extracted surfaces onto the other, and thereafter, elastically transforming the entire second volumetric image using local deformations determined as a function of local displacements of points on the warped surface. It is a further object that said local deformations be determined in three dimensions.

Briefly, the foregoing and other objects of the invention are satisfied by extracting corresponding goal and start surfaces from the first and second images, respectively, by identifying spaced apart surface sample points lying on the surfaces, connecting these points by line segments so that they form vertex points of adjoining triangular polygonal patches which tile the surfaces, and coarsely registering and overlaying the two surfaces. Then, surface matching is carried out by, for each vertex point on each surface, determining a displacement vector between the vertex point and a nearest patch of the other surface, so as to produce a set of displacement vectors for the vertex points of the two surfaces. A force field is calculated from the sets of displacement vectors, and the goal surface is iteratively warped into registration with the start surface in response to the force field, to determine a set of 3D displacement vectors applicable to vertex points on the goal surface. Thereafter, this set of displacement vectors is adjusted by removal of any global translation component to form a set of 3D residual vectors which correspond to deformation of the goal surface. Then, a 3D deformation vector at each lattice point of the first volumetric image is determined from the set of residual vectors utilizing a spatially decaying weighting function having a decay constant which corresponds to a degree of elastic stiffness of the volume. The negative of the sum of each 3D deformation vector and the global translation vector, when applied to a lattice point of the second volumetric image, indicates the source location in Volume 2 of a voxel center whose intensity is to be moved to the lattice point. Since such voxel is not in general centered at a lattice point, its intensity is found by interpolation with respect to intensities at neighboring lattice points. These movements of interpolated voxels to lattice points of the second volumetric image (including start surface vertex points) are then carried out and comprise an elastic transformation.

The decay constant is chosen relatively large, initially, corresponding to relatively great elastic stiffness and a measure of convergence (registration) between the first and second volumetric images is formed. The steps of extraction of the surface from the first volumetric image, surface matching, and lattice deformation vector determination are repeated in an iteration until sufficient convergence is obtained, with the decay constant being decreased at each stage in the iteration.

Other objects, features and advantages of the present invention will become apparent upon perusal of the following detailed description when taken in conjunction with the appended drawing, wherein:

BRIEF DESCRIPTION OF THE DRAWING

FIG. 8 is a three dimensional representation of the result of the 3D volume distortion vector calculation step in the flow chart of FIG. 2.

DETAILED DESCRIPTION OF THE PREFERRED EMBODIMENTS

1. General Description of the Apparatus

Figure 1:
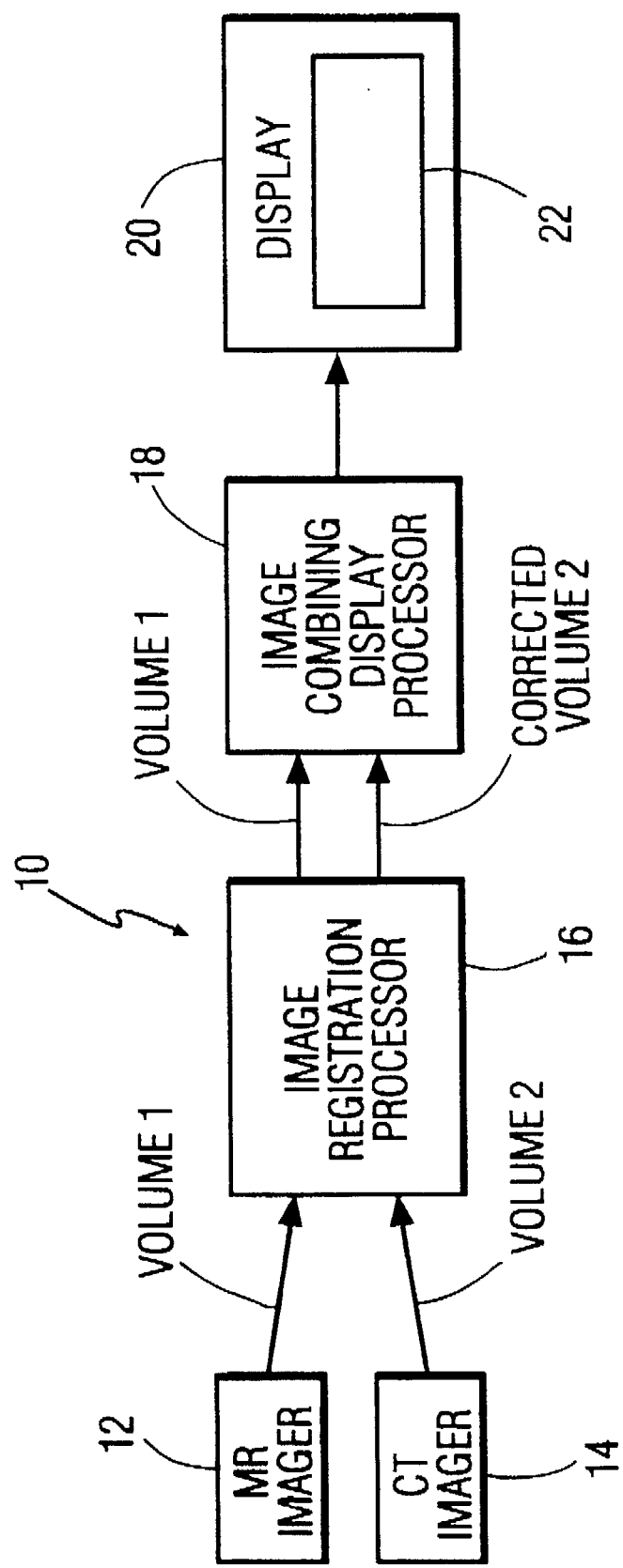
FIG. 1 is a schematic diagram of imaging apparatus including a registration processor for registering first and second volumetric images in accordance with the principals of the present invention.

Referring first to FIG. 1 of the drawing, there is generally illustrated a multimodality imaging apparatus 10 comprising a Magnetic Resonance (MR) imager 12 and an X-ray Computed Tomography (CT) imager 14 for successively scanning the same body, for example a desired anatomy region of a human patient, and producing respective volumetric images, Volume 1 and Volume 2, thereof. Each of the volumetric images may be obtained in a 3D mode (e.g. by translating the patient table in the CT imager to produce a helical scan) or as 2D images of a plurality of generally parallel slices comprising a stack. The combination of imaging modalities illustrated is exemplary, and other combinations of two or more modalities can be used, although MR and CT produce particularly complimentary information—CT being of somewhat better spatial resolution and producing particularly good visualization of bone and MR producing better visualization and contrast with respect to soft tissue, enabling distinguishing between white and gray matter and between normal tissue and tumors. Further, the principles of the present invention are equally applicable to volumetric images obtained from the same imaging modality at different times, and to where one of the volumetric images is a standard image, obtained for example from a computerized anatomical atlas. The principles of the present invention are also applicable to industrial inspection applications. In each application mentioned, registration of two volumetric images is necessary. For ease of explanation, the discussion shall proceed in the context of the illustrated multimodality imaging apparatus 10.

It should be appreciated that to accomplish the MR and CT scanning procedures, the body must be successively positioned in the bores of the MR and CT imagers, 12 and 14. Because of the absence of precise positioning of the patient with respect to the patient tables or the isocenters of the imagers, there is no inherent precision in alignment between the volumetric images produced. Consequently, in addition to the easily accounted for usual differences in scale, and spatial and intensity resolution between the images produced by these two imaging modalities, there are significant differences in position and orientation of the body in the images. Further, the scanners themselves may introduce geometric distortion. Where rigid body assumptions tend to hold, such as where the imaged region is the head, the differences in position and orientation may be compensated for by global translation and rotation, respectively. However, in most studies, particularly those of regions of the torso, these rigid body assumptions do not hold because of local deformation.

The volumetric images, Volume 1 and Volume 2, produced by MR imager 12 and CT imager 14, respectively, are conveyed to an image registration processor 16. Therein, in addition to the usual compensation for difference in scale and intensity and spatial resolution, as well as global differences in position and orientation, one of the volumetric images, for example as illustrated, Volume 2, is elastically warped to a corrected volumetric image, Corrected Volume 2. Both the first volumetric image, Volume 1, and the corrected second volumetric image, Corrected Volume 2, which is considered registered with the first volumetric image, are conveyed to an image combining display processor 18. Processor 18 produces one or more selected views which are mapped into a two dimensional image conveyed to display 20. The latter includes a display screen 22, such as the face of a CRT. Plural selected views appear in side by side relationship. A selected view may be of the voxels along a selected slice, which may be oblique and/or non-planar, through one of the volumetric images. Further views of the same selected slice from the different modalities may be mapped in side by side relationship for simultaneous viewing on display screen 22. Additionally, synthetic images may be produced of a slice (or of a projection) which combines image data from the two volumetric images. This can be accomplished by segmentation, e.g. the area within one or more user defined contours being MR data and the area outside being CT data. Alternatively, all displayed pixels can be arrived at as a function of the intensities of slice pixels provided by each modality. For example, these data can be combined into intensity and color attributes of displayed pixels, providing potentially great clinical utility.

2. Contour Extraction

Figure 2:
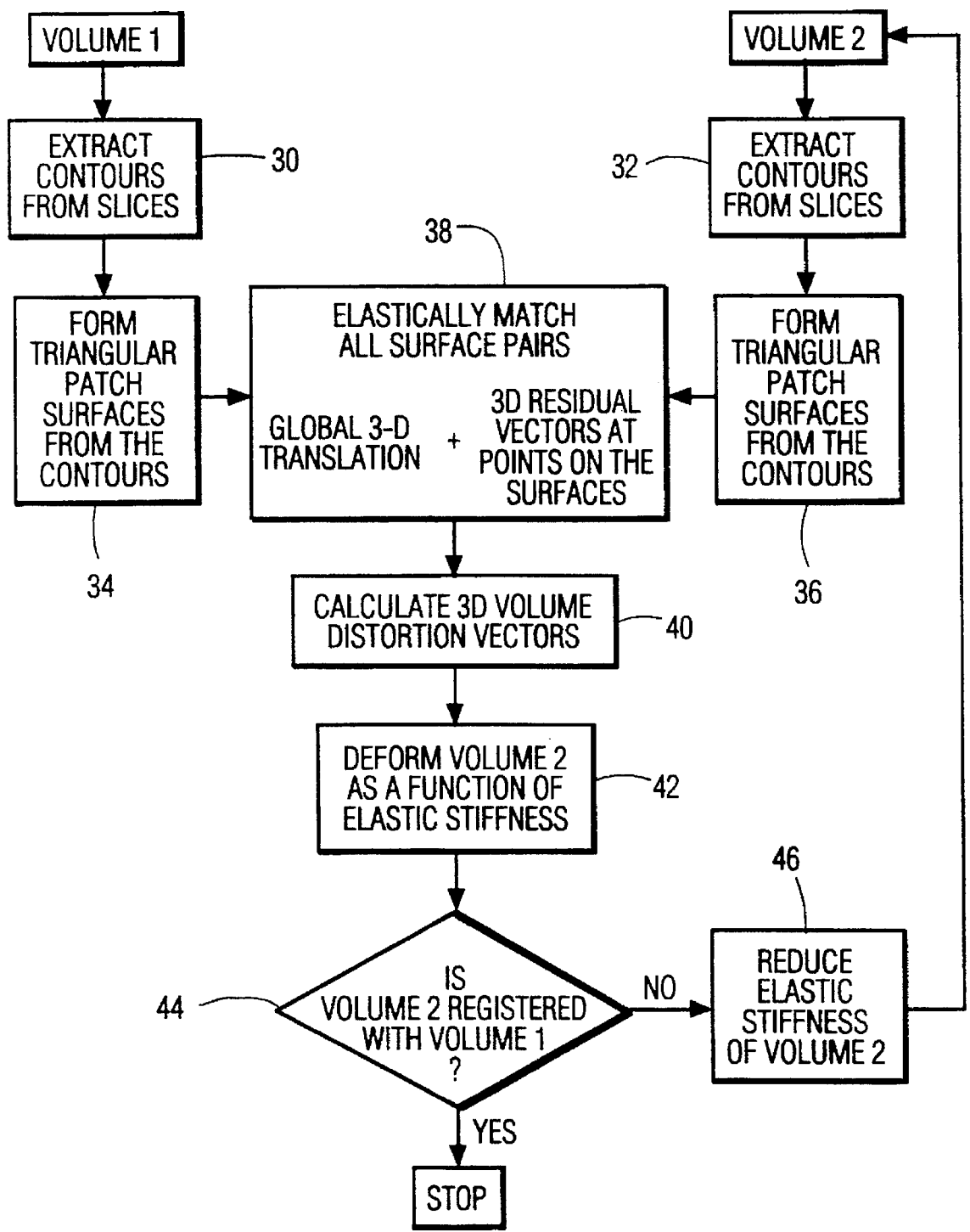
FIG. 2 is a flow chart of the operation of the registration processor in FIG. 1.

For purposes of explanation of the registration process carried out by processor 16 as illustrated in the flow chart of FIG. 2, both Volumes 1 and 2 are considered as stacks of parallel two dimensional slices which are, in general, spaced-apart. Three dimensional data can be similarly viewed as a stack of adjoining one voxel thick slices. The two volumetric data collections, Volumes 1 and 2, are applied to respective contour extraction process blocks 30 and 32 which extract corresponding closed contours from slices comprised by the volumes. These contours lie on corresponding surfaces $\vec{S}1$ and $\vec{S}2$ of Volumes 1 and 2, respectively.

While it is recognized that with further development, it may be possible to entirely automate the entire contour extraction process using built in knowledge of the anatomy of the body region scanned, the present best mode of implementing the contour extraction process involves user interaction. Thus, images of one or more slices in each of Volumes 1 and 2 are displayed on a monitor and contours which are well delineated by sharp transitions in intensity as lying on corresponding surfaces in the Volumes 1 and 2, are designated by a user by outlining them with a position inputting device (not shown) such as a mouse, trackball, light pen or digitizing tablet. Each user inputted outline, which may be somewhat rough, is treated as a seed contour. Suitably well delineated corresponding surfaces which may used for registering MR and CT volumetric images are typically at a tissue\bone interface.

The seed contours are preferably automatically smoothed in shape while being pulled toward locations of intensity transition in the immediate neighborhood of the seed contour. The present best mode for adjusting the seed contour to an extracted contour involves using an minimizing active contour function termed a "snake" which was first proposed in M. Kass et al, "Snakes: Active Contour Models", International Journal of Computer Vision (1988), pp. 321–331, as a means for locking on to local features such as edges, and contours in an image and once locked on, tracking them in motion or matching them in stereopsis. An extension thereof for an iteratively determined spline closed contour is described in commonly owned U.S. Pat. No. 5,239,591 entitled "Contour Extraction In Multi-Phase, Multi-Slice Cardiac MRI Studies By Propagation of Seed Contours Between Images". Further, as shown by Ranganath, it is possible, and preferable, to automatically propagate an extracted contour for a slice to a seed contour for an adjoining slice. Alternatively, the extracted contour for a slice might be displayed in an image of an adjoining slice for verification or adjustment by the user to arrive at the seed contour for the displayed adjoining slice. Thus, seed contours are developed for each slice, with user interaction to the extent necessary and appropriate for the anatomy studied.

The spline closed contour for a slice, at an initial stage in an iteration, assumes the shape and location of the seed contour for that slice, and at any stage in the iteration is defined by:

$$V(s) = (x(s), y(s))$$

where (x(s) and y(s)) are its coordinates as a function of arc length along the spline contour. An energy of the system comprising the spline and its interaction with its immediate environment is defined as the sum of integrations of internal and external energies at points along the spline contour:

$$E = \oint E_{int}(V(s))ds + \oint E_{ext}(V(s))ds$$

where an energy due to external forces acting on a point at location s on the spline contour comprises an energy which is derived from the image and an energy derived from any allowed user inputted constraints, each of which is determined as a function of the coordinates of the contour point:

$$E_{ext}(V(s)) = E_{image}(V(s)) + E_{user}(V(s))$$

Since, it is desired to attract the spline contour to image points of strong transition in intensity, the image energy function, $E_{image}(V(s))$, should have a strong minimum at such points. A suitable choice for this function is:

$$E_{image}(V(s)) = -|\nabla I(V(s))|$$

where I(V(s)) is the intensity of the slice image at a point at location s on the spline contour and $\nabla$ is the gradient operator. User defined constraints may be such constructs as user inputted barrier contours, as suggested by Ranganath, which are assigned high energy in order to repel the spline contour away from nearby areas of strong intensity gradient which do not lie on the contour desired to be extracted.

The internal energy of a contour point at location s, which represents resistance of the spline contour to stretching and bending, is expressed by:

$$E_{int}(V(s)) = \frac{\alpha(s)|V_s(s)|^2 + \mu(s)|V_{ss}(s)|^2}{2}$$

The subscripts denote derivatives, and the functions $\alpha(s)$ and $\mu(s)$ relate to the stretching and bending energies. The contour which is extracted is found by minimizing the total energy functional E. In the continuous case, Euler-Lagrange equations yield the necessary conditions for a minimum. For numerical implementation, standard finite difference approximations to derivatives yield the discrete version of the Euler-Lagrange equations as:

$$A\underline{x} + \underline{E}_x(\underline{x},\underline{y}) = 0$$

$$A\underline{y} + \underline{E}_y(\underline{x},\underline{y}) = 0$$

where the spline contour is comprised by B discrete sample points having coordinates $\underline{x},\underline{y}$, $\underline{E}_x$ and $\underline{E}_y$ are B element vectors of partial derivatives of the external energy, and A is a B×B pentadiagonal matrix which depends only on the internal energy parameters, $\alpha$ and $\mu$. The structure of A allows its inversion in O(B) operations. This pair of implicit nonlinear equations can be simplified by using the same assumptions as Kass et al. to yield a pair of iterative equations:

$$A\underline{x}_n + F_x(\underline{x}_{n-1}, \underline{y}_{n-1}) = -\tau(\underline{x}_n - \underline{x}_{n-1})$$

$$A\underline{y}_n + F_y(\underline{x}_{n-1}, \underline{y}_{n-1}) = -\tau(\underline{y}_n - \underline{y}_{n-1})$$

whose solution converges to a local minimum of the energy functional, using a descent step size, $\tau$. Each iteration is O(B) operations, and so is quite efficient numerically.

3. Forming Triangular Patch Surfaces

Figure 3:
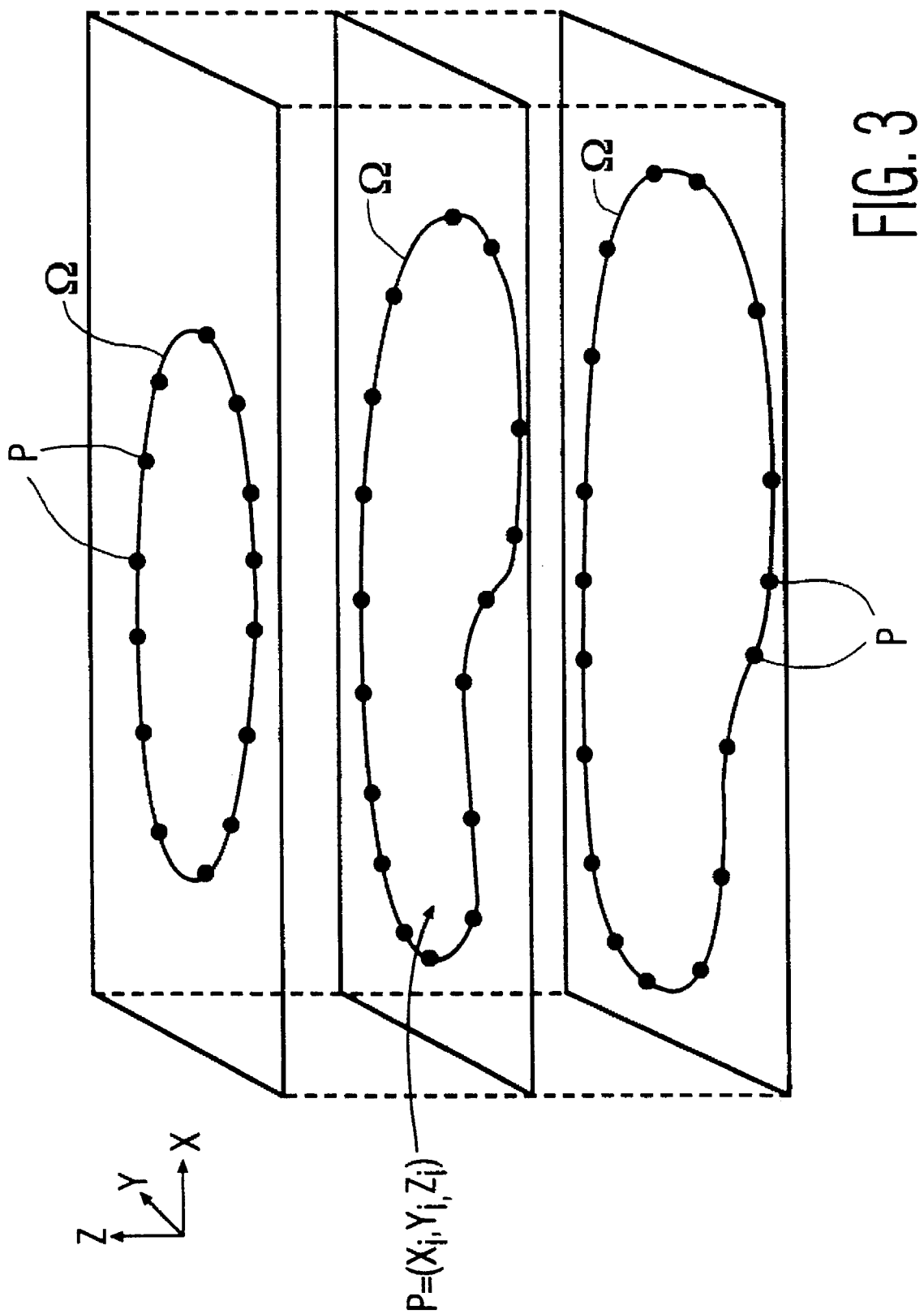
FIG. 3 is a three dimensional representation of contours extracted by contour extraction steps in the flow chart of FIG. 2 with respect to each volumetric image.
Figure 4:
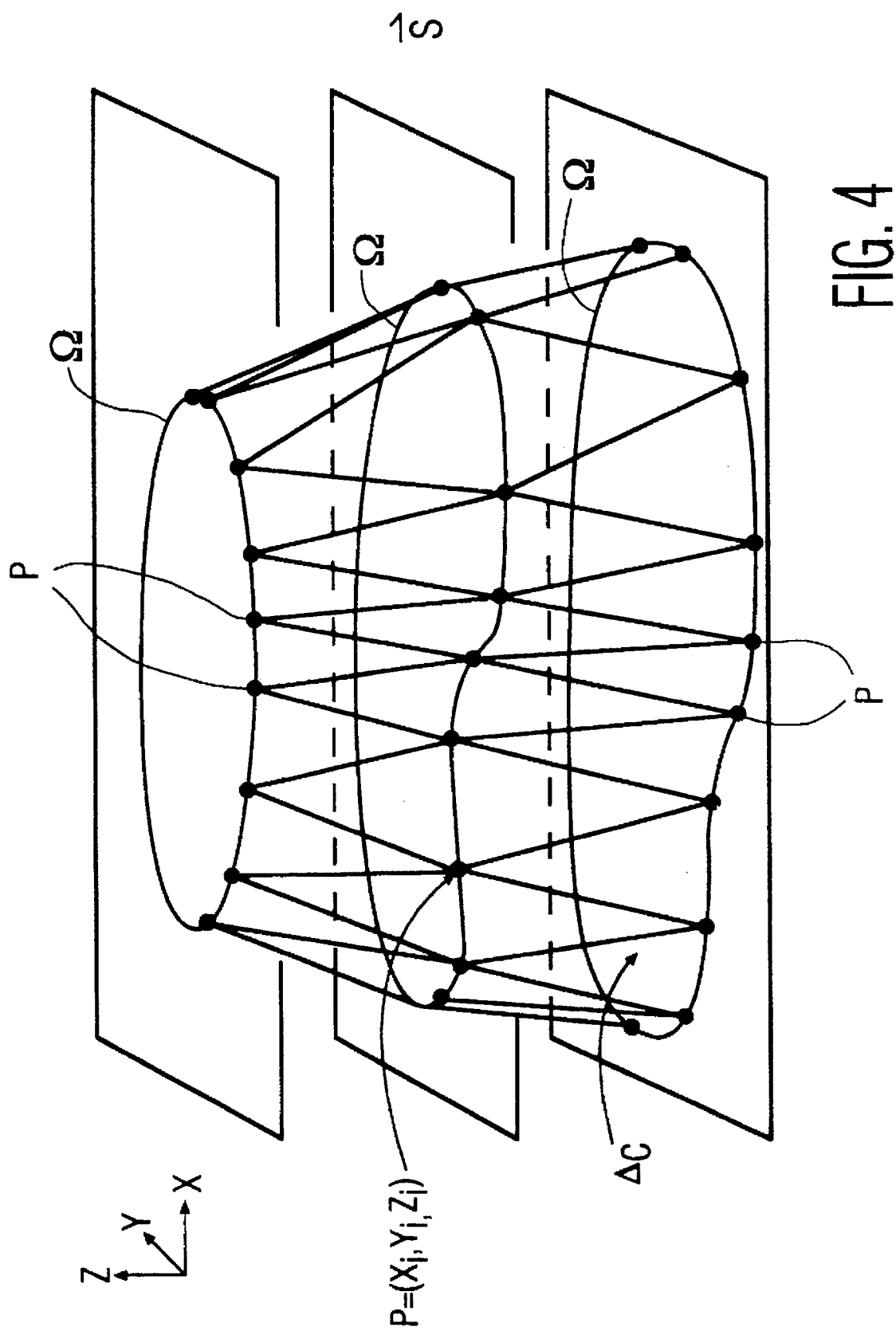
FIG. 4 is a three dimensional representation of surface tiling by triangular patch surface formation steps in the flow chart of FIG. 2 with respect to each volumetric image.

Contour extraction leads to a stack of contours $\Omega$, as shown FIG. 3, for each of Volumes 1 and 2. These contours are sampled by spaced apart points P, which for each volume collectively comprise sample points on an extracted surface. Thus, collections of sample points P on extracted surfaces $\vec{S}1$ and $\vec{S}2$ from respective Volumes 1 and 2 have respective sets of three dimensional coordinates $x_i, y_i, z_i$ and $x_j, y_j, z_j$. For Volumes 1 and 2, process blocks 34 and 36 of FIG. 2 are applied, respectively, to interconnect these points by lines in a manner, as shown in FIG. 4, to tile the respective extracted surfaces $\vec{S}1$ and $\vec{S}2$ with polygonal, and preferably, triangular, patch surfaces $\Delta_c$ and $\Delta_d$, respectively. Therein, each patch surface $\Delta$ has vertices of two successive points P on one contour $\Omega$ and one point P on a successive contour. Preferably, the algorithm of H. N. Christiansen et al. "Conversion of complex contour line definitions into polygonal element mosaics", Computer Graphics, 12, 1978, pp.. 187–192 is used to tile in a manner that interconnecting lines between points on successive contours have minimum length. Given two contours with a and b points, respectively, this method requires O(a+b) operations to produce the triangle patches. In practice, the contours are resampled to get fewer points and reduce computation cost further.

The surfaces, $\vec{S}1$ and $\vec{S}2$, are then represented by their respective ordered vertex and triangle patch lists:

$$\vec{S}1(i,c) = \{(x1_i, y1_i, z1_i), \Delta_c\}$$

for vertices $1 \le i \le N1$ and triangle patches $1 \le c \le T1$, and $$\vec{S}2(j,d) = \{(x2_j, y2_j, z2_j), \Delta_d\}$$

for vertices $1 \le j \le N2$ and triangle patches $1 \le d \le T2$.

4. Surface Matching

Surface matching is performed in process block 38 of FIG. 2 using a 3D elastic method that is an extension of the 2D algorithm proposed by Burr, as aforementioned. Given a start surface and a goal surface, this algorithm determines a force field to distort one surface shape to the other. Conveniently, the goal surface is warped toward registration with the start surface by forces derived from local pattern matches between the goal and start surfaces. This algorithm uses an iterative Gaussian smoothed deformation model. The steps are:

(a) Coarsely register and overlay the two surfaces. For each vertex point in each surface, find the nearest triangle surface patch from the other surface based on a distance measure using a similarity measure between surface patches.

(b) Determine two sets of displacement vectors from vertices of the respective two surfaces to nearest triangle patches of the other surface.

(c) Calculate a force field from the two sets of displacement vectors of the two surfaces.

(d) Iteratively deform one surface to the other.

(e) Determine a global translation vector and a set of surface distortion vectors.

Although the opposite is possible, it is preferable for ease of computation to deform the goal surface to the start surface. Hence, the discussion will proceed on that basis.

The details of these steps are described below:

(a) The Nearest Patch of One Surface to a Vertex of the Other

The vector notation $\vec{P}1(i)$ and $\vec{P}2(i)$ is used to refer to associated vertices of $\vec{S}1(i,c)$ and $\vec{S}2(j,d)$, respectively, of the surfaces registered for coarse alignment. A similarity measure has to be adopted to find for every vertex in $\vec{S}1(i,c)$, a corresponding point which lies on some triangle patch $\Delta_d$ of $\vec{S}2(j,d)$. A dissimilarity distance between a vertex and a triangle patch includes directional properties as well as spatial Euclidean distance. The dissimilarity distance is defined to be the sum of a directional incompatibility measure and a positional difference.

Figure 5A:
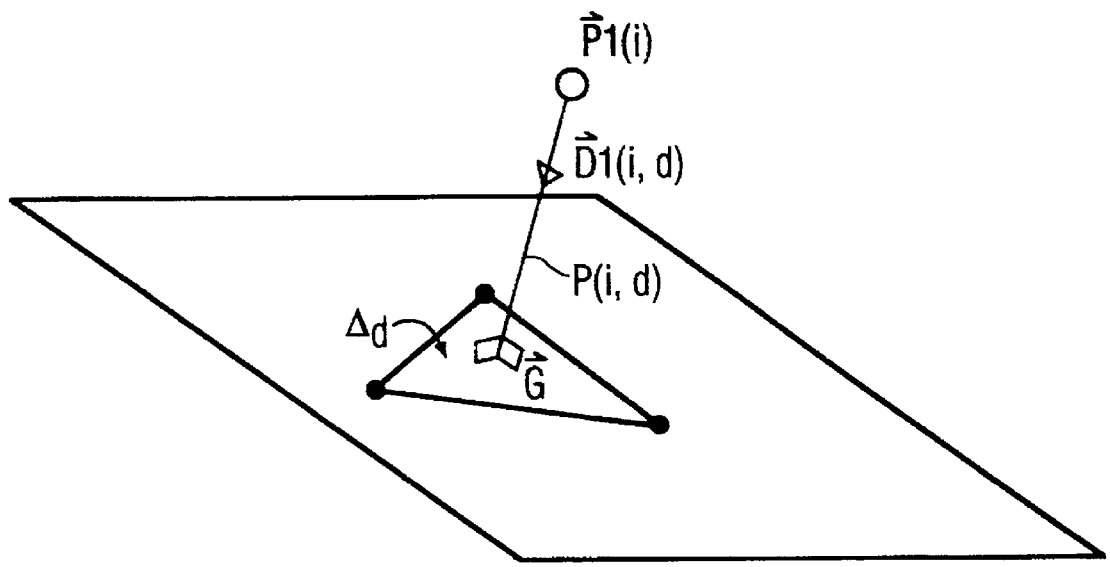
FIGS. 5a and 5b are three dimensional representations of the geometry of two different cases with respect to the determination of a displacement vector from a patch surface vertex of one of the volumetric images in carrying out a surface pair elastic match step in the flow chart of FIG. 2.
Figure 5B:
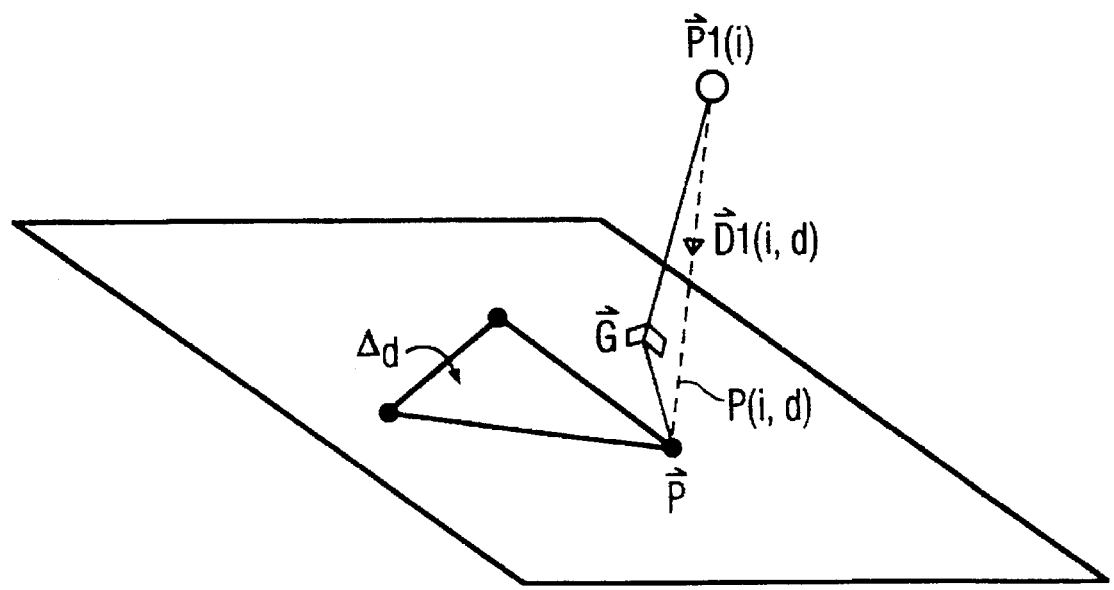

FIGS. 5a and 5b illustrate the geometry for determination of the positional difference, having a magnitude $\rho(i,d)$, from a vertex $\vec{P}1(i)$ of surface $\vec{S}1$ to a triangle patch $\Delta_d$ of surface $\vec{S}2$. Let $\vec{G}$ be the point of intersection of the perpendicular from $\vec{P}1(i)$ to $\Delta_d$. FIG. 5a shows the case when $\vec{G}$ lies on or inside $\Delta_d$. In this case:

$$\rho(i,d) = |\vec{G} - \vec{P}1(i)|$$

If, however, $\vec{G}$ lies outside $\Delta_d$ as in FIG. 5b and $\vec{P}$ is the closest triangle vertex to $\vec{G}$, then:

$$\rho(i,d) = |\vec{G} - \vec{P}1(i)| + |\vec{G}|$$

The directional incompatibility measure, $\omega(i,d)$, between a vertex $\vec{P}1(i)$ and a triangle patch $\Delta_d$ is a function of the orientation of the plane of $\Delta_d$ and patches that share $\vec{P}1(i)$ as a vertex. In particular, it is the average of the sines of the angles between the planes. When the planes are parallel, the directional incompatibility measure is zero. When they are orthogonal, it is 1. Otherwise, its value lies between 0 and 1.

The total dissimilarity distance, $\delta(i,d)$, between a vertex $\vec{P}1(i)$ and a triangle patch $\Delta_d$ is then defined as:

$$\delta(i,d) = \omega(i,d) + \rho(i,d)$$

Positional difference is the dominant term. The directional incompatibility measure is used to resolve the ambiguity when two positional difference values are very close. For a vertex $\vec{P}1(i)$, the shortest distance triangle patch in $\vec{S}2$ is denoted, using index $d_i$, as:

$$Min_d \delta(i,d) = \delta(i,d_i)$$

(b) The Displacement Vectors

The next step after finding the nearest triangle patch to a vertex is to determine its displacement vector. FIGS. 5a and 5b also show the geometry of the displacement vector.

$\vec{D}1(i,d)$, associated with a vertex $\vec{P}1(i)$ and the triangle patch $\Delta_d$. When the perpendicular drop point, $\vec{G}$, lies on or inside the triangle (FIG. 5a), the displacement vector is:

$$\vec{D}1(i,d) = \vec{G} - \vec{P}1(i)$$

However, when $\vec{G}$ falls outside the triangle itself (FIG. 5b), the displacement vector connects to the nearest point $\vec{P}$ of triangle $\Delta_d$, and:

$$\vec{D}1(i,d) = \vec{P} - \vec{P}1(i)$$

Figure 6A:
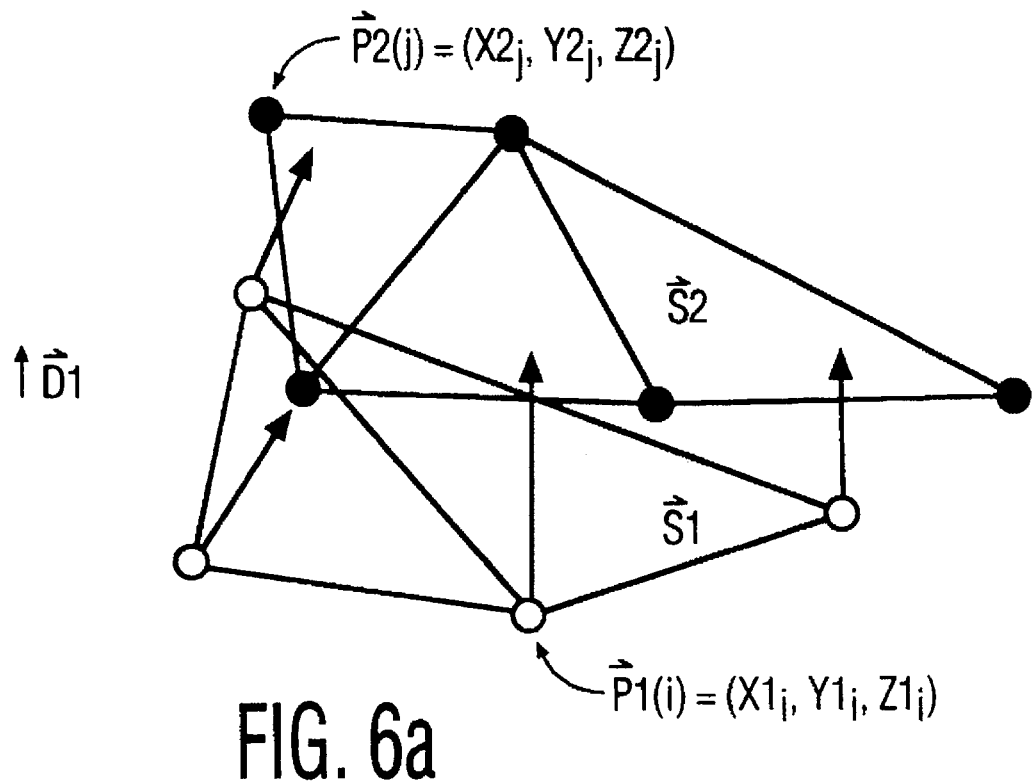
FIGS. 6a and 6b are three dimensional representations of respective first and second sets of displacement vectors associated with the patch surface vertices of the respective first and second volumetric images, which are determined by the surface pair elastic match step in the flow chart of FIG. 2.
Figure 6B:
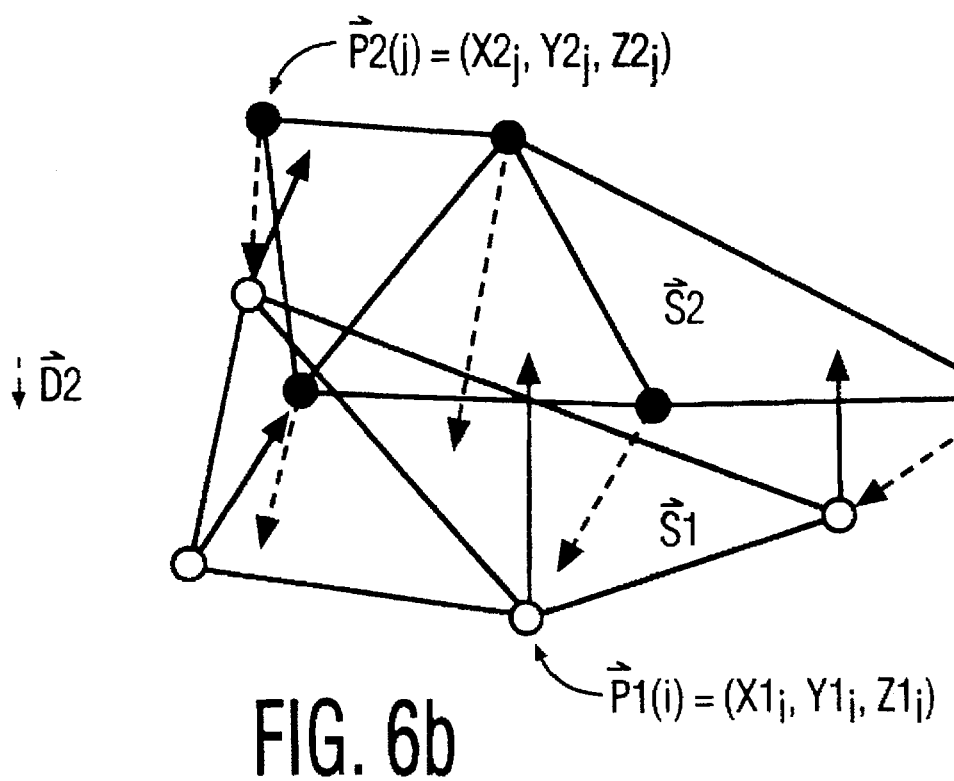

By reversing the roles of the start and goal surfaces, the displacement vector $\vec{D}2(i,d)$ can be defined at each vertex $\vec{P}2(j)$ of $\vec{S}2$. FIGS. 6a and 6b illustrate the displacement vectors of portions of a pair of surfaces. These vector fields represent forces acting on one surface to distort it to be like the other surface. By modeling one surface with elastic properties, it can respond to the force field, but also contribute a smoothing effect and reduce local match errors.

(c) Determining the Force Field

A force field $\vec{DS}(x,y,z)$ comprising smoothed displacement vectors acting on surface $\vec{S}1$ is defined as a weighted average of neighboring displacement vectors. A Gaussian weight function is used to give more influence to near neighbors and less influence to far neighbors. The smoothed displacement field $\vec{DS}(x,y,z)$ is a function of pushing and pulling forces:

$$\vec{DS}(x,y,z) = \gamma^{-1} \cdot \left[ \frac{\sum_{i=1}^{N1} G1_i \cdot \vec{D}1(i,d_i)}{\sum_{i=1}^{N1} G1_i} - \frac{\sum_{j=1}^{N2} G2_j \cdot \vec{D}2(j,c_j)}{\sum_{j=1}^{N2} G2_j} \right]$$

where $G1_i$ and $G2_j$ are Gaussian weights defined by:

$$G1_i = e^{\frac{-[(x-x1_i)^2 + (y-y1_i)^2 + (z-z1_i)^2]}{\sigma_k^2}}$$

$$G2_j = e^{\frac{-[(x-x2_j-D2_x(j,c_j))^2 + (y-y2_j-D2_y(j,c_j))^2 + (z-z2_j-D2_z(j,c_j))^2]}{\sigma_k^2}}$$

and $\gamma$ is a damping factor. Values less than 1 result in overshoot, and values greater than 1 result in undershoot. $\sigma_k$ is defined as:

$$\sigma_k = \sigma_0 f^{-k}$$

where f is a constant and $1 \leq f \leq 2$. $\sigma_k$ is the smoothing neighborhood at the kth iteration and gradually decreases after each iteration.

(d) Iterated Deformation of One Surface to the Other

Consider again the start surface $\vec{S}2(j,d)$, and the goal surface $\vec{S}1(i,c)$. First, $\vec{DS}^0(x^0,y^0,z^0)$ is computed, where the superscript denotes the 0th iteration. Define surface $\vec{W}^1$ from $\vec{W}^0 = \vec{S}1$ by:

$$\vec{W}^1(i,c) = \vec{W}^0(i,c) + \vec{DS}^0(x_i^0, y_i^0, z_i^0)$$

In general:

$$\vec{W}^k(i,c) = \vec{W}^{k-1}(i,c) + \vec{DS}^{k-1}(x_i^{k-1}, y_i^{k-1}, z_i^{k-1})$$

The iterations stop if:

$$\frac{1}{N1} \sum_{i=1}^{N1} |\vec{DS}(x1_i, y1_i, z1_i)| < \epsilon$$

where $\epsilon$ is a predefined small number.

The displacement vectors required to register the vertices of $\vec{S}1(i,c)$ with surface $\vec{S}2(j,d)$ are then given by:

$$\vec{u}_i = \{((x1'_i - x1_i), (y1'_i - y1_i), (z1'_i - z1_i))\}$$

for $1 \leq i \leq N1$. In practice, there can be many pairs of surfaces. Each pair is matched separately and results in its own set of displacement vectors $(\vec{u})_m$ where the subscript denotes pair m. If there are M surface pairs altogether, the final displacement vector set, $\vec{U}_l$, is given by:

$$\vec{U}_l = \bigcup_{m=1}^{M} (\vec{u})_m$$

for $1 \leq l \leq Q$, where Q represents the total number of vectors of all the pairs combined. Thus:

$$\vec{U}_l = \{((x1'_l - x1_l), (y1'_l - y1_l), (z1'_l - z1_l))\}$$

(e) Global Translation and Local Residual Vectors

Figure 7:
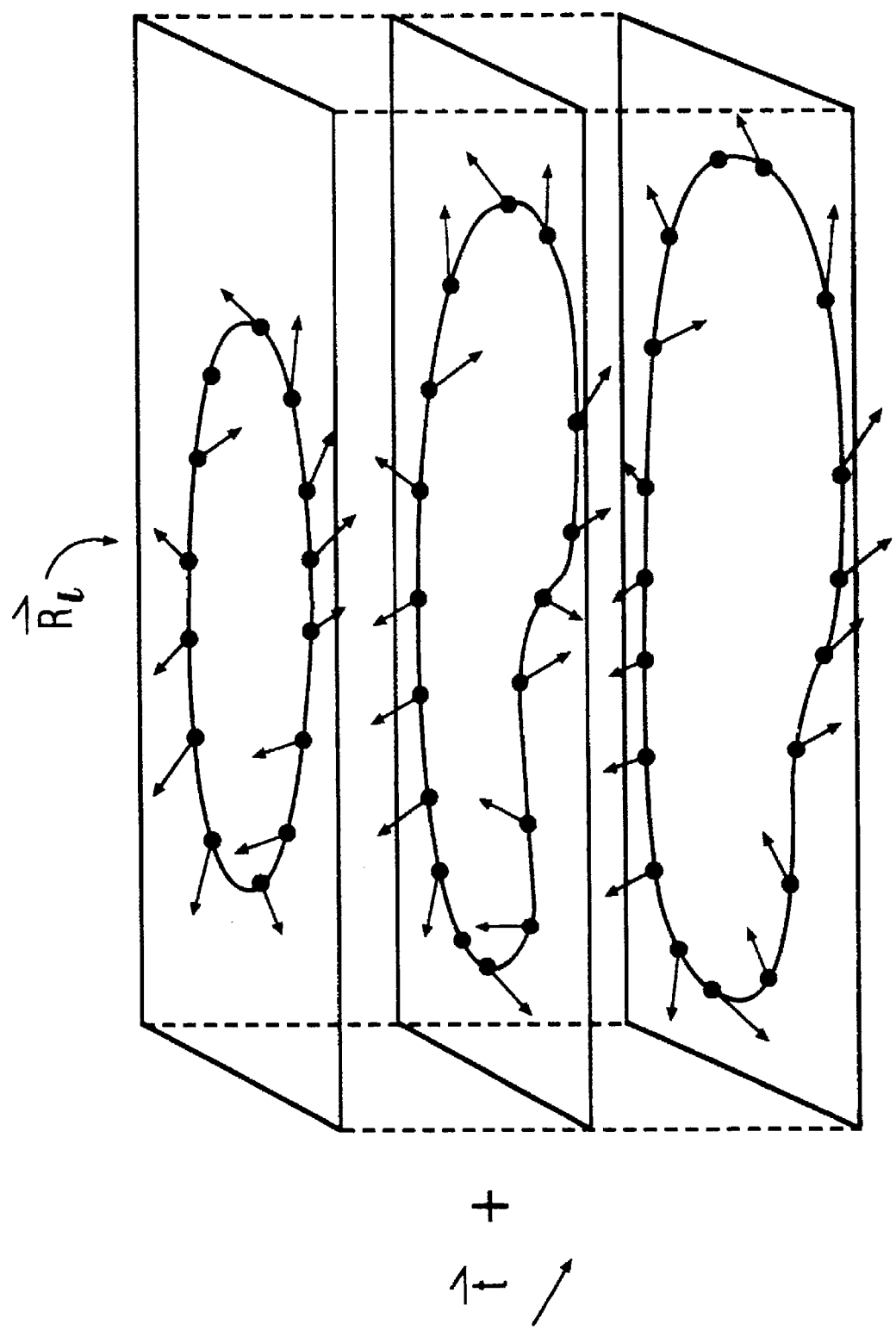
FIG. 7 is a three dimensional representation of global translation and surface distortion vectors determined by the surface pair elastic match step in the flow chart of FIG. 2.

The displacement vectors, $\vec{U}_l$, can be represented as the sum of a global translation vector with a local residual vector set, as illustrated in FIG. 7. Let $(x_{cg}, y_{cg}, z_{cg})$ represent the centroid of the total displacement vector set, $\vec{U}_l$. A global translation of $\vec{t} = (x_{cg}, y_{cg}, z_{cg})$ represents a coarse registration of the surfaces in the two volumes. The residual vectors are then given by:

$$\vec{R}_l = \{((x1'_l - x1_l) - x_{cg}, (y1'_l - y1_l) - y_{cg}, (z1'_l - z1_l) - z_{cg})\}$$

for $1 \leq l \leq Q$. These residual vectors represent local distortions of the surfaces.

5. Calculation of Volume Distortion Vectors

In the absence of further matching information, distortions of the lattice of the deformed volume are approximated by, in process block 40 of FIG. 2, interpolating $\vec{R}_l$ onto the entire Volume 2 to as ilustrated in FIG. 8, determine volume distorton vectors acting at lattice points. Since the surfaces are assumed to have random direction, a weighted mean interpolation scheme is adopted. The volume distortion vector at lattice point (x,y,z) is given by:

$$\vec{V}(x,y,z) = \frac{\sum_{l=1}^{Q} F_l(x,y,z) \cdot \vec{R}_l}{\sum_{l=1}^{Q} F_l(x,y,z)}$$

where $F_l(x,y,z)$ is the weighting factor for the contribution of residual vector l to the distortion vector at (x,y,z). The weighting factor must decrease with distance, since distant vectors should have less influence on distortion calculations at a lattice point than close vectors. The weights should also converge asymptotically to zero for large distances and be positive. The exact form of the weighting function is somewhat arbitrary. An exponential decay function was chosen for the weighting factors, although other functions such as the Gaussian could also be used. Thus:

$$F_l(x,y,z) = e^{-\frac{\sqrt{(x-x_l)^2+(y-y_l)^2+(z-z_l)^2}}{\beta}}$$

for $1 \leq l \leq Q$, and $\beta$ is the decay constant which determines the effective interacting neighborhood of the vectors. Large values of $\beta$ result in more significant weights for distant residual vectors, than small $\beta$ values which essentially give non-zero weights to closeby vectors. The initial value of $\beta$ is chosen manually and depends on the amount of deformation between the two volumes. If one volume is very distorted compared to the other, a large $\beta$ value is chosen initially. This results in a nearly rigid transformation and avoids tearing of the volume.

6. Elastic Deformation of Volume 2

Because the goal surface is warped into the start surface and distortion vectors determined relative to Volume 1, the negative of the sum of the global translation vector $\vec{t}$ and the distortion vector applied at a lattice point of Volume 2, indicates the location in Volume 2 of a voxel, not generally centered at a lattice point, whose intensity, as determined by interpolation with regard to the surrounding lattice points, is to be placed in Volume 2 at the lattice point. Had the start surface been warped into the goal surface, such that the translation vector $\vec{t}$ and distortion vectors $\vec{V}(x,y,z)$ were applied to reposition the lattice points of Volume 2, then an interpolation resampling of Volume 2 would be required. In either case, the interpolation is preferably trilinear and the resultant determination in process block 44 of FIG. 2 of interpolated intensities at the lattice points of Volume 2 as a result of the application of the distortion vectors completes one iteration of the registration scheme.

7. Measure of Mis-registration Between Volumes and Iteration

Mis-registration is measured in block 44 of FIG. 2 by the normalized sum of the magnitudes of the displacement vectors. The volumes are considered registered and iterations stop when:

$$\frac{1}{Q} \cdot \sum_{i=1}^{Q} |\vec{U}_i| < T$$

where T is a predefined small threshold.

As long as the above criterion for registration is not yet satisfied, via block 46, the steps of contour extraction, surface formation, surface matching, and transform computation are repeated starting with Volume 2 as last deformed by box 42. Box 46 introduces a decrease in $\beta$ in each iteration to reduce the interacting neighborhood of the vectors and allow matching of fine detail. This effectively reduces the elastic stiffness of the volume with each iteration, and satisfies the need for more localized matching as the volumes become more closely registered. Let $\beta_v$ represent the value of $\beta$ at the vth iteration, and $\beta_0$ be the initial starting value. Then empirically, $$\beta_v = \beta_0 \cdot h^{-v}$$

where h is a constant chosen to be between 1 and 2.

It should now be apparent that the objects of the present invention have been satisfied in the registration of volumetric images. While the present invention has been described in particular detail, it should also be appreciated that numerous modifications are possible within the intended spirit and scope of the invention.

What is claimed is:

1. A 3D imaging method comprising:
   a) scanning at least a region of an object with an imaging modality to obtain one of first and second relatively geometrically deformed three dimensional volumetric images containing voxels throughout said first and second volumetric images at positions corresponding to a three dimensional grid of lattice points, the other of said first and second images being available;
   b) extracting a first surface from the first image by identifying spaced apart surface sample points lying on the first surface, said first surface delineating a feature of said object in said first image;
   c) extracting a second surface from the second image by identifying spaced apart surface sample points lying on the second surface, said second surface delineating in said second image the same feature of said object as delineated by said first surface in said first image;
   d) automatically, without input from an operator, determining a set of 3D surface point deformation vectors applicable to the respective sample points of one of the first and second surfaces which would register said sample points of said one surface with the other of said first and second surfaces;
   e) automatically, without input from an operator, deriving a three dimensional volumetric set of 3D lattice point deformation vectors corresponding to said three dimensional grid of lattice points, each of said 3D lattice point deformation vectors being derived by applying a weighting function to said 3D surface point deformation vectors which are within a vicinity of said derived 3D lattice point deformation vector, said weighting function including a decay constant $\beta$ which determines the effective size of said vicinity; and
   f) automatically, without input from an operator, applying said three dimensional volumetric set of 3D lattice point deformation vectors to corresponding voxels throughout the entire volume of said three dimensional second image to elastically transform said three dimensional second image into a three dimensional compensated image,
   wherein the spaced apart surface sample points lying on the first surface are vertex points of polygonal patches which tile the first surface, the spaced apart surface sample points lying on the second surface are vertex points of polygonal patches which tile the second surface, and said determining a set of 3D surface point deformation vectors is in response to a 3D force field and comprises the steps of:
   g) for each vertex point on the first and second surfaces, determining a 3D displacement vector directed to a nearest patch of the other surface, so as to produce first and second sets of displacement vectors applicable to the vertex points of the first and second surfaces, respectively; and
   h) determining said 3D force field as a function of said first and second sets of displacement vectors.

2. The imaging method as claimed in claim 1, wherein said set of 3D surface point deformation vectors determined is applicable to the respective sample points of the first surface for warping the first surface toward the second surface.

3. The imaging method as claimed in claim 2, further comprising:

g) forming a measure of the degree of mis-registration between the compensated image and the first image; and h) repeating steps d) through f), by substituting a last compensated image for said second image, until said measure does not exceed a predetermined maximum, said weighting function being a weighted mean interpolation function and said decay constant $\beta$ being modified for each said repeating of steps d) through f) in a direction so as to reduce the effective size of said vicinity in order to elastically deform said last compensated image in ever finer detail.

4. The imaging method as claimed in claim 2, further comprising the step of simultaneously displaying at least image portions from said first and said compensated images.

5. The method of claim 2, further comprising the step of displaying an image whose voxels are determined as a function of the intensities of corresponding voxels of said first and said compensated images.

6. The imaging method as claimed in claim 1, further comprising:

g) forming a measure of the degree of mis-registration between the compensated image and the first image; and h) repeating steps d) through f), by substituting a last compensated image for said second image, until said measure does not exceed a predetermined maximum, said weighting function being a weighted mean interpolation function and said decay constant $\beta$ being modified for each said repeating of steps d) through f) in a direction so as to reduce the effective size of said vicinity in order to elastically deform said last compensated image in ever finer detail.

7. The imaging method as claimed in claim 6, further comprising the step of simultaneously displaying at least image portions from said first and said compensated images.

8. The method of claim 6, further comprising the step of displaying an image whose voxels are determined as a function of the intensities of corresponding voxels of said first and said compensated images.

9. The imaging method as claimed in claim 1, further comprising the step of simultaneously displaying at least image portions from said first and said compensated images.

10. The method of claim 1, further comprising the step of displaying an image whose voxels are determined as a function of the intensities of corresponding voxels of said first and said compensated images.

* * * * *